Aug. 30, 1927.

C. H. AYARS 1,640,745

MACHINE FOR PREPARING FRUITS FOR CANNING

Filed Dec. 31, 1925   3 Sheets-Sheet 3

WITNESSES:
Alfred E. Tschinger
Chas. E. ...

INVENTOR:
Charles H. Ayars,
BY Joshua R. H. Potts
ATTORNEY.

Patented Aug. 30, 1927.

1,640,745

UNITED STATES PATENT OFFICE.

CHARLES H. AYARS, OF SALEM, NEW JERSEY, ASSIGNOR TO AYARS MACHINE COMPANY, OF SALEM, NEW JERSEY.

MACHINE FOR PREPARING FRUITS FOR CANNING.

Application filed December 31, 1925. Serial No. 78,560.

My invention relates to machines for preparing fruit for canning and is more especially designed for use in canning tomatoes.

For proper preparation of tomatoes, for canning the whole fruit, it is essential that the core and the hard part of the stem end which is of a green or yellow color should be removed, and that this should be done without rupturing the seed bags. So far as I am aware this has never been adequately effected. Some of the prior coring machines fail to remove the green or yellow part and some disrupt the seed bags.

The objects of my invention are to provide simple and effective mechanism which will remove the butts, including the core and the hard parts, without rupturing the said bags, and to provide simple and effective means for scalding the fruit preparatory to skin removal.

Figure 1:
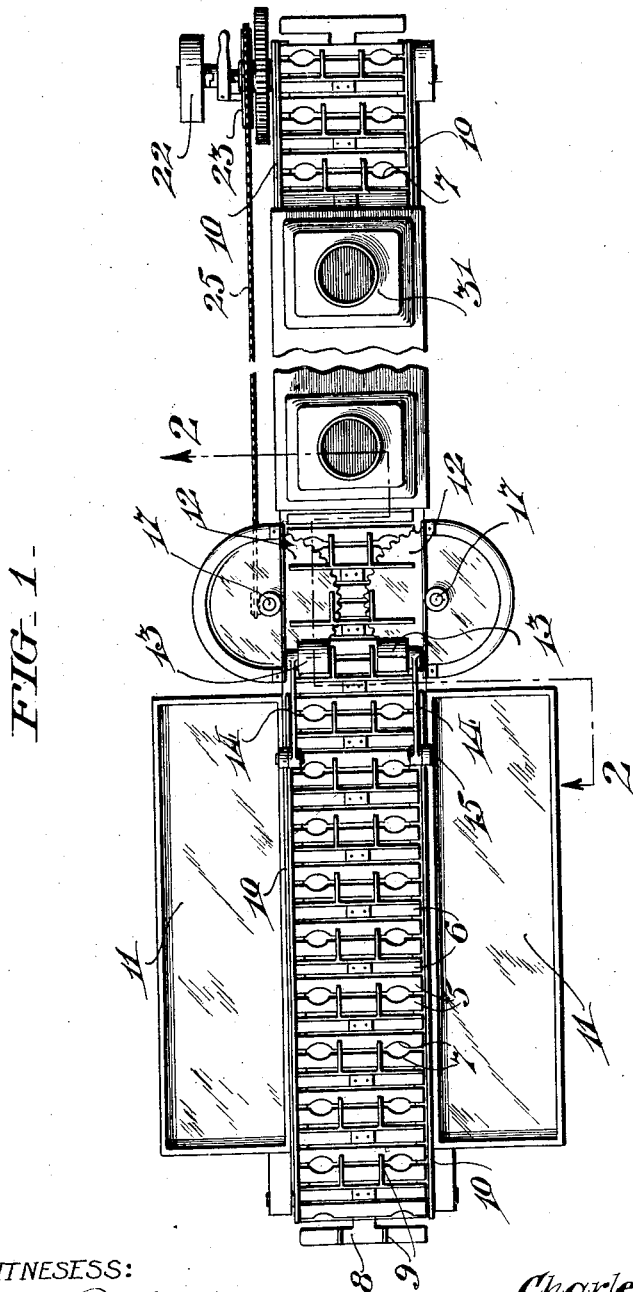
Figure 2:
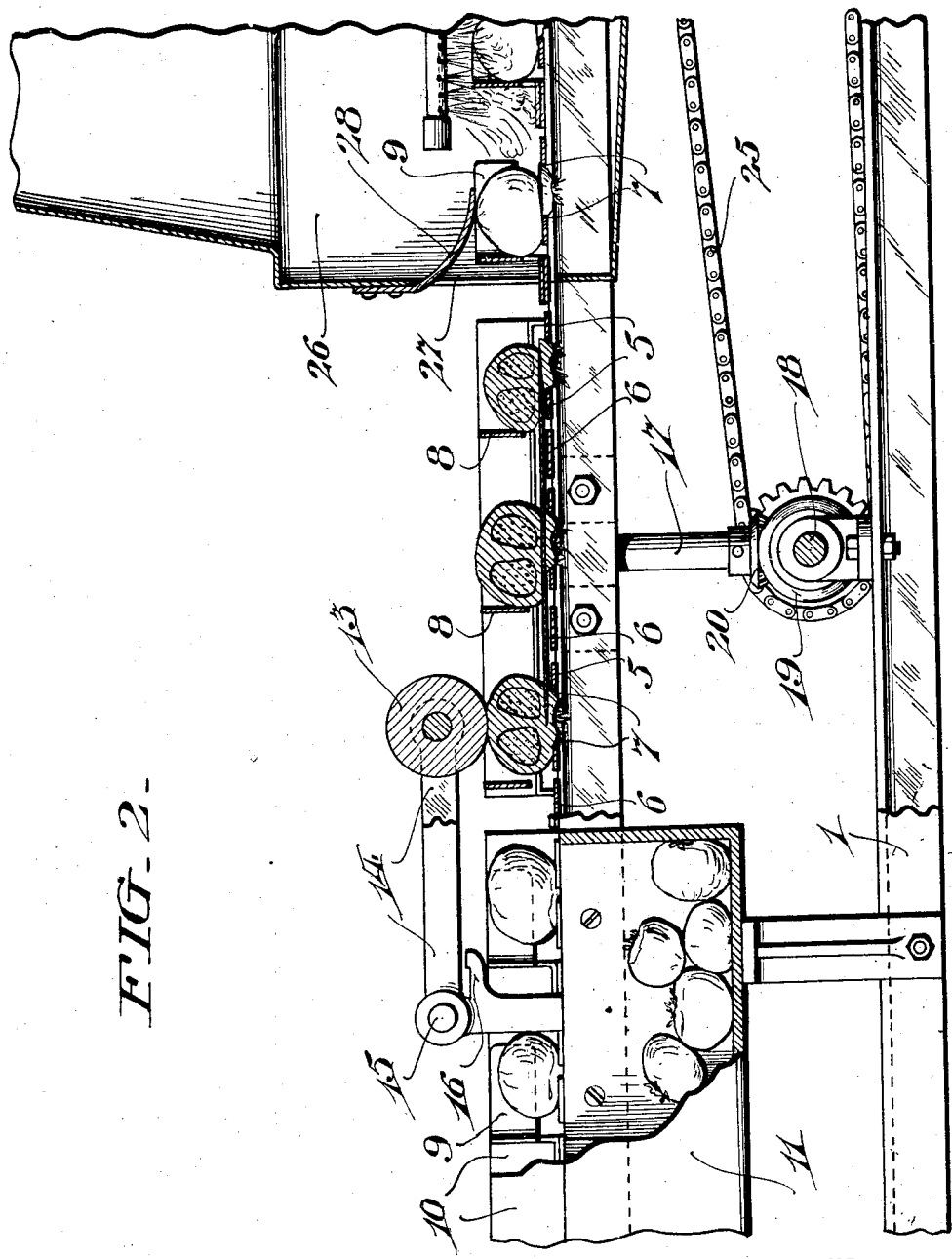
Figure 3:
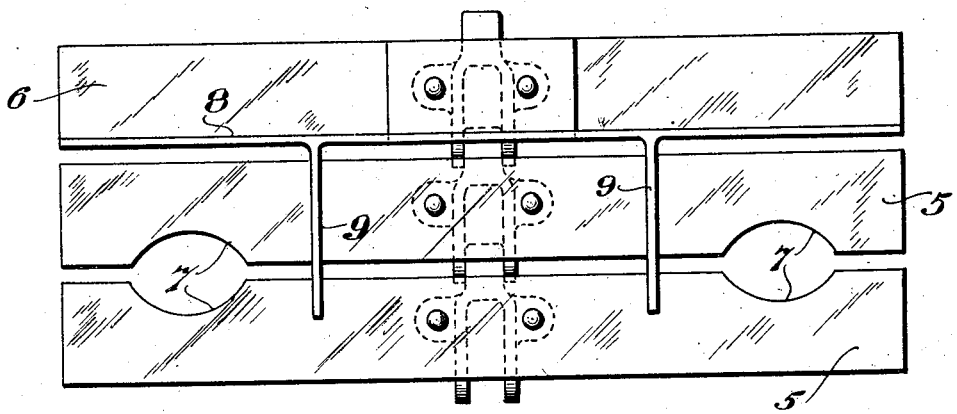
Figure 4:
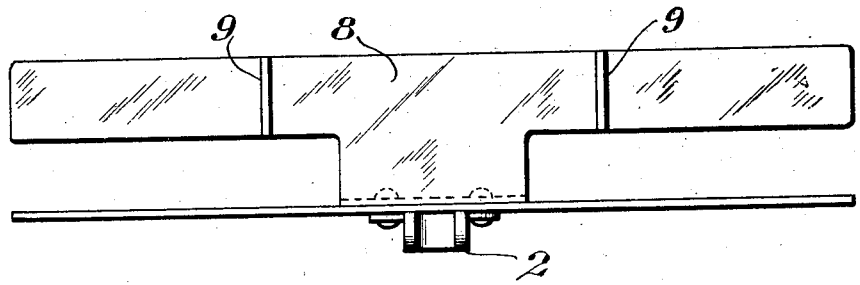
Figure 5:
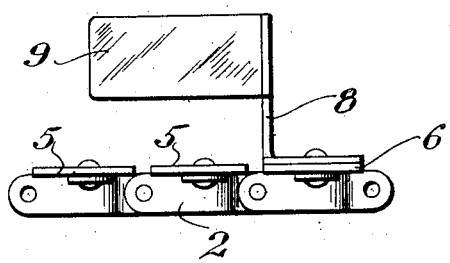

These objects, and other advantageous ends which will be described hereinafter, I attain in the following manner, reference being had to the accompanying drawings in which Figure 1 is a plan view of a machine embodying my invention, Figure 2 a section on line 2—2 of Figure 1, Figure 3 a plan view of one unit of the conveyor, Figure 4 a front elevation of the same, and Figure 5 a side elevation of the same.

Referring to the drawings, 1 represents the frame of the machine, 2 an endless conveyor extending from end to end of the machine mounted on sprocket wheels 3 and 4 and driven by power applied to the latter. The conveyor is designed to carry two rows of tomatoes, one on each side, and the bed of the conveyor is composed of laterally extending slats 5 and 6, two of the slats 5 being disposed between two of the slats 6. Slats 5 are provided near each end with opposed notches 7 forming a receptacle, hereinafter called a seat, adapted to receive a tomato. Slats 6 carry an upwardly extending plate 8 which serves as a back plate to prevent rearward movement of the tomatoes and the back plate carries forwardly extending ribs 9 adapted to prevent lateral movement of the tomatoes in one direction. Flanges 10 projecting upwardly from the frame adjacent the sides of conveyor prevent lateral movement in the other direction. Feed boxes 11 are provided on each side of the conveyor from which the tomatoes are placed in their seats, by the hands of the operators, with their stem ends downward.

In advance of the feed boxes and on each side of the machine, a cutting disk 12, preferably having a notched or scalloped cutting edge, is disposed in the line of travel of the tomatoes and sufficiently above the conveyor to permit it to sever the butt below the seed bags. To insure against tilting or other displacement of the tomatoes by the initial cutting operation, a roller 13 is disposed above the line of travel of the tomatoes on each side of the machine and above the forward edge of the respective cutting disks. The rollers are pivotally mounted on arms 14 which are pivoted to the frame at 15, a stop 16 being provided to limit the downward movement of the arm. The cutting disks are fixed to vertical shafts 17 to which rotary motion may be imparted by a horizontal shaft 18 carrying bevel gears 19 meshing with bevel gears 20 on shafts 17. The conveyor may be driven by a shaft 21 to which sprocket wheel 4 is fixed, by a pulley 22 driven from any suitable source of power. Motion may be imparted to shaft 18 by a sprocket wheel 23 fixed to shaft 21, a sprocket wheel 24 fixed to shaft 18 and a sprocket chain 25 connecting the sprocket wheels.

As the tomatoes leave the cutting disks they pass into a scalding chamber which consists of a casing 26 disposed in the line of travel of the conveyor and having, at each end, an opening 27 to permit the conveyor to pass therethrough, the openings being closed by flexible baffles 28 which ride on the tops of ribs 9.

After passing through the scalding chamber, the cores are discharged over the tail end of the conveyor and the tomatoes may be removed by hand or otherwise.

I prefer to provide the cutting disks with notched or scalloped edges as such edges require less pressure to sever the skin than does an unbroken edge of comparatively large arc. I prefer to make the notches 7 of oval shape but any form which will adequately position and seat the tomato will serve the purpose.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A machine for preparing fruits for canning including an endless conveyor provided with spaced seats for the fruit; a rotary cutting disk adapted to sever the butts; means for holding the fruit against displacement, and means for imparting motion to the conveyor and the cutting disk.

2. A machine for preparing fruits for canning including an endless conveyor provided with spaced seats for the fruit; a rotary cutting disk having a notched cutting edge adapted to sever the butts; means for holding the fruit against displacement, and means for imparting motion to the conveyor and the cutting disk.

3. A machine for preparing fruits for canning including an endless conveyor provided with spaced seats for the fruit; a rotary cutting disk adapted to sever the butts; a pivotally mounted arm carrying a roller disposed above the engaging edge of the cutting disk and controlled by gravity to ride on a tomato approaching the disk, and means for imparting motion to the conveyor and the cutting disk.

4. A machine for preparing fruits for canning including an endless conveyor provided with spaced seats for the fruit; a rotary cutting disk adapted to sever the butts; a pivotally mounted arm carrying a roller disposed above the engaging edge of the cutting disk and adapted to ride on a fruit approaching the disk; a stop for limiting the downward movement of the arm, and means for imparting motion to the conveyor and the cutting disk.

5. A machine for preparing fruits for canning including a frame; an endless conveyor mounted thereon having a bed consisting of lateral slats provided with rows of spaced seats for the fruit and intermediate slats carrying back plates and forwardly extending ribs; flanges extending upwardly from the frame adjacent the sides of the conveyor; rotary cutting disks adapted to sever the butts of the fruit in each row, and means for imparting motion to the conveyor and the cutting disks.

In testimony whereof I have signed my name to this specification.

CHARLES H. AYARS.